United States Patent [19]
Zundel et al.

[11] 3,804,613
[45] Apr. 16, 1974

[54] ORE CONDITIONING PROCESS FOR THE EFFICIENT RECOVERY OF NICKEL FROM RELATIVELY HIGH MAGNESIUM CONTAINING OXIDIC NICKEL ORES

[75] Inventors: Weldon P. Zundel, Golden; John W. Lane, Lakewood; Melvin L. Taylor, Arvada, all of Colo.

[73] Assignee: American Metal Climax, Inc., New York, N.Y.

[22] Filed: Sept. 16, 1971

[21] Appl. No.: 181,045

[52] U.S. Cl.................. 75/101 R, 75/115, 75/119, 423/150
[51] Int. Cl............................................. C22b 23/04
[58] Field of Search.......... 75/115, 101 R, 121, 119; 423/138, 150

[56] References Cited
UNITED STATES PATENTS

| | | | |
|---|---|---|---|
| 2,872,306 | 2/1959 | Morrow | 75/101 R |
| 3,082,080 | 3/1963 | Simons | 423/138 X |
| 3,093,559 | 6/1963 | White et al. | 75/115 X |
| 3,293,027 | 12/1966 | Mackiw et al. | 75/115 X |

Primary Examiner—Oscar R. Vertiz
Assistant Examiner—J. Cooper
Attorney, Agent, or Firm—Kasper T. Serijan

[57] ABSTRACT

Magnesium-containing oxidic nickel ore is conditioned in a closed circuit leaching process in preparation for leaching at high pressure and temperature by preleaching the ore with the final leach liquor obtained during the subsequent high pressure leaching of the conditioned ore, the leach liquor having hydrolyzable acid-consuming constituents dissolved therein which hydrolyze out of the solution during the preleach to generate additional free acid to solubilize the magnesium in the ore during the conditioning step.

15 Claims, 9 Drawing Figures

ORE CONDITIONING PROCESS FOR THE EFFICIENT RECOVERY OF NICKEL FROM RELATIVELY HIGH MAGNESIUM CONTAINING OXIDIC NICKEL ORES

This invention relates to the recovery of nickel and cobalt from nickeliferous oxidic ores and, in particular, to a method of conditioning the ore prior to leaching out the nickel and cobalt values, whereby to improve the efficiency thereof in terms of decreased acid consumption.

The term "primary leach" employed herein is meant to cover the main leaching step for separating nickel and cobalt values from oxidic ores by leaching at elevated temperatures and pressures, while the term "pre-leach" is understood to cover the step of conditioning the ore to render it more amenable to the efficient and economic recovery of nickel and cobalt during the primary leach.

STATE OF THE PRIOR ART

It is known to recover nickel and cobalt from lateritic and serpentine ores. One method is to pulp low nickel ore (95 percent passing 325 mesh) to approximately 40 percent solids, the pulp being preheated to about 160° to 180°F and the nickel and cobalt selectively leached with sulfuric acid at elevated temperature and pressure (e.g. 475°F and 525 psig) to solubilize about 95 percent each of the nickel and cobalt.

The leached pulp is cooled and then washed by countercurrent decantation, with the washed pulp going to tailings. The acid pH which is quite low is then neutralized with coral mud to a pH of about 2.5 to 2.8 and the thus-treated product liquor (containing generally about 4 to 6 grams of nickel per liter) is then subjected to sulfide precipitation by preheating the leach liquor and carrying out the precipitation with $H_2S$ in an autoclave at about 250°F and a pressure of about 150 psig. Usually, nickel sulfide seed is added at the feed end to assure substantially complete precipitation of the nickel and cobalt.

After the sulfide precipitate has been washed and thickened to about 65 percent solids, it is oxidized in an autoclave at about 350°F and a pressure of about 700 psig. The solution of solubilized nickel and cobalt is neturalized with ammonia to a pH (5.35) sufficient to precipitate any iron, aluminum and chromium present using air as an oxidant, the precipitate being thereafter separated from the solution. The nickel and cobalt solution is thereafter adjusted in pH to about 1.5 and $H_2S$ added to selectively precipitate any copper, lead and zinc present, which precipitate is separated from the solution by filtration. The nickel is then selectively recovered from the solution by various methods, one particular method comprising treating the solution in an autoclave with hydrogen at a pressure of about 650 psig at a temperature of about 375°F, using nickel powder as seed material.

The amount of acid employed to leach the low nickel ore is in substantial excess of the stoichiometric amount necessary because of the presence of substantial amounts of acid-consuming constituents in the ore, such as magnesium, aluminum, iron and the like. Generally, the pH of the pregnant liquor is quite low and in order to adjust it for the sulfide precipitation of the nickel and cobalt values, an alkaline agent is added, e.g. coral mud, which imposes economic disadvantages on the process.

In Canadian patent No. 618,826 (dated Apr. 28, 1961), a method is proposed for adjusting the pH of the pregnant liquor following leaching by employing additional ore in the form of a slurry to neutralize excess acid. However, the ores employed need not contain nickel and cobalt in sufficiently high concentrations and, in fact, may be off-grade lateritic ores. The patent states that if ore is employed to neutralize excess acid, it is preferred to add subsequently some lime, limestone or other alkaline agent to adjust the pH of the product of pregnant liquor to the level required for satisfactory precipitation of aluminum and iron contamination. Nowhere is any mention made of hydrolyzing out the aluminum and iron during neutralization with ore, nor is any mention made of the importance of temperature control on hydrolysis.

However, an economic problem which has presented itself is one of leaching relatively high magnesium-containing low nickel ores while conserving as much acid as possible for leaching the contained nickel and cobalt. For example, ores containing over 1 percent and ranging up to about 15 percent or higher of magnesium pose such a problem. A particular ore presenting such a problem is a nickel-containing serpentine ore containing by weight about 1.83% Ni, 0.091% Co, 28.8% Fe, 1.29% Al, 1.4% Cr, 0.27% Mn, 4.9% acid soluble Mg, 29.0% $SiO_2$, combined oxygen and gangue material. In order to solubilize 95% each of nickel and cobalt using sulfuric acid, substantial amounts of the acid are employed per pound of ore, for example 0.4 to 0.5 pounds of acid per pound of ore. It would be economically beneficial if the amount of acid could be decreased substantially, as the cost of reagent plays an important part in the cost of the final nickel product.

OBJECTS OF THE INVENTION

It is thus the object of the invention to provide a hydrometallurgical method for recovering nickel from oxidic ores containing magnesium in substantial acid-consuming amounts while conserving the amount of acid employed in the leaching ore.

Another object is to provide a method of leaching relatively high magnesium-containing nickel ores by employing substantially less amounts of acid per pound of ore than is normally employed, by conditioning the ore before subjecting it to the primary leaching step, the conditioning step comprising preleaching fresh ore with pregnant liquor obtained from the primary leach.

A still further object of the invention is to provide a method of conditioning oxidic nickel ore prior to subjecting it to primary leaching by preleaching it with pregnant liquor resulting from the primary leaching step, the pregnant liquor being characterized by the presence of hydrolyzable constituents which generate free acid by hydrolysis during the conditioning cycle.

These and other objects will more clearly appear when taken in conjunction with the following disclosure and the accompanying drawings, wherein:

FIGS. 3 and 4 are graphs illustrating the extraction of nickel, i.e. FIG. 3, outside the invention shown as a function of acid-to-ore ratio as compared to FIG. 4 within the invention;

STATEMENT OF THE INVENTION

In its broad aspects, the invention is directed to a method of efficiently recovering nickel and cobalt from oxidic ores containing magnesium and other acid-consuming constituents, wherein the ore is high pressure leached (primary leach) at an elevated temperature with a sulfuric acid solution of predetermined concentration, the pregnant liquor resulting from the primary leach being then employed to condition fresh ore in a feed-back circuit preparatory to subjecting the conditioned ore to the primary leaching step.

Thus, in conditioning the ore, the pregnant solution from the primary leach is recycled to the ore feeding step, the pregnant liquor with residual free acid therein, being mixed with the fresh ore at ordinary atmospheric pressure at a temperature of over about 60°C and ranging up to about the boiling point thereof, preferably from about 80°C to 95°C, for a time at least sufficient to dissolve a substantial amount of the magnesium constituent in the ore and effect hydrolysis of substantial amounts of the hydrolyzable acid-consuming constituents in the pregnant solution which results in the regeneration of free acid for dissolving additional magnesium.

The conditioned ore is thickened and the pregnant liquor separated therefrom, the nickel and cobalt being subsequently recovered from the liquor. The thickened conditioned ore containing the bulk of the nickel and cobalt (a small amount of nickel and cobalt having been dissolved during the ore-conditioning step) is then fed to an autoclave where it is high pressure leached with a sulfuric acid solution at an elevated temperature, the amount of sulfuric acid employed per pound of ore being substantially less than that normally employed on unconditioned ore.

Figure 1:
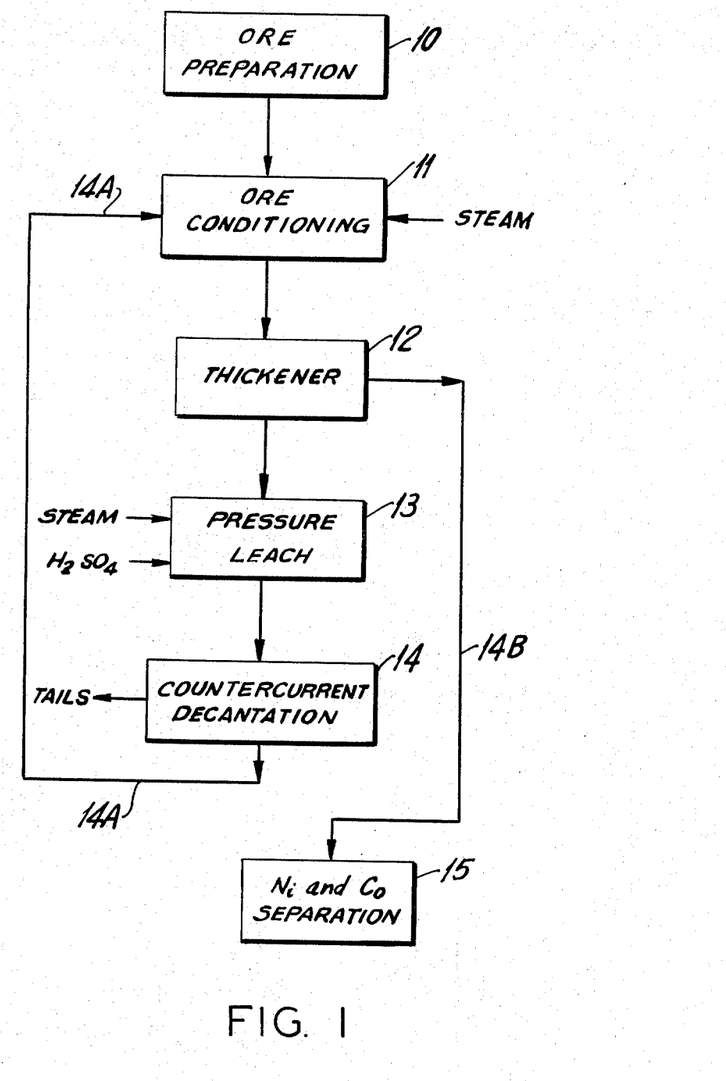
FIG. 1 is a flow sheet for carrying out one embodiment of the invention.

Referring to the flow sheet of FIG. 1, the ore is prepared at 10, following which the ore is conditioned at 11 by recycling pregnant liquor 14A obtained from pressure leach 13 after removing the solids by countercurrent decantation at 14. After conditioning the ore at 11 at about 80° to 95°C at ambient pressure, the conditioned ore is thickened to a solids content of about 35 percent, the pregnant liquor 14B following conditioning of the ore going to nickel and cobalt separation.

The thickened ore together with the hydrolyzed constituents is fed to pressure leach 13 where steam and sulfuric acid are added to carry out the primary leaching step as stated hereinabove.

DETAILS OF THE INVENTION

One ore in which markedly improved results have been obtained is a relatively high magnesium-containing serpentine ore having the following composition by weight: about 1.83% Ni, 0.09% Co, 28.8% Fe, 1.29% Al, 1.4% Cr, 0.27% Mn, 4.9% acid soluble magnesium and 29% $SiO_2$, the balance of the ore being combined oxygen and some gangue material. This type of ore generally uses up a relatively high amount of sulfuric acid ranging anywhere from about 0.42 to 0.45 per pound of acid per pound of ore to assure 95 percent nickel extraction from the ore in 60 minutes at a temperature of about 240°C and a pressure of about 525 psig. On the other hand, by using a pregnant solution containing about 16 grams per liter [the expression "grams per liter" is hereinafter referred to as "gpl"] of sulfuric acid because of dilution during countercurrent decantation (0.063 pound acid per pound ore) for conditioning the fresh ore (e.g. preleach) at a solids content of about 20.4 percent for 4 hours detention time at about 79° to 92°C followed by the pressure leach (primary leach) at 240°C (525 psig) for 60 minutes, a 95 percent nickel extraction is obtained with an acid-to-ore ratio of 0.30, a saving of about 28.6 percent acid. Thus, the preleach has a conditioning effect on the ore which results in greater acid saving during high pressure leaching than the amount of acid employed in the preleach.

As illustrative of the advantages of the invention, the following example is given:

EXAMPLE 1

A leaching cycle is prepared following the flow sheet of FIG. 1 starting with the serpentine ore mentioned hereinbefore. The terminal leaching solution contains 40 to 45 gpl of free sulfuric acid which following countercurrent decantation is diluted to about 16 gpl of free acid per liter. A charge of fresh ore (95 percent minus 200 mesh) of about 3 pounds is conditioned with about 5.7 liters of pregnant liquor containing about 16 gpl free sulfuric acid to a pH of about 0.75, about 1.5 gpl aluminum, about 2.5 gpl iron, about 0.1 gpl chromium and about 9.4 gpl magnesium for up to about 4 hours at an average temperature in the range of about 80° to 90°C.

After 2 hours at the aforementioned temperature, the iron in the solution begins to hydrolyze from solution (pH — 1.65) as the free acid is consumed by the fresh ore and as the pH rises. After about 4 hours at 80° to 90°C, 89 percent of the leached iron has hydrolyzed from the solution (pH — 1.98). After 17 hours, the pH reaches 2.55 and essentially all of the iron is hydrolyzed.

Figure 6:
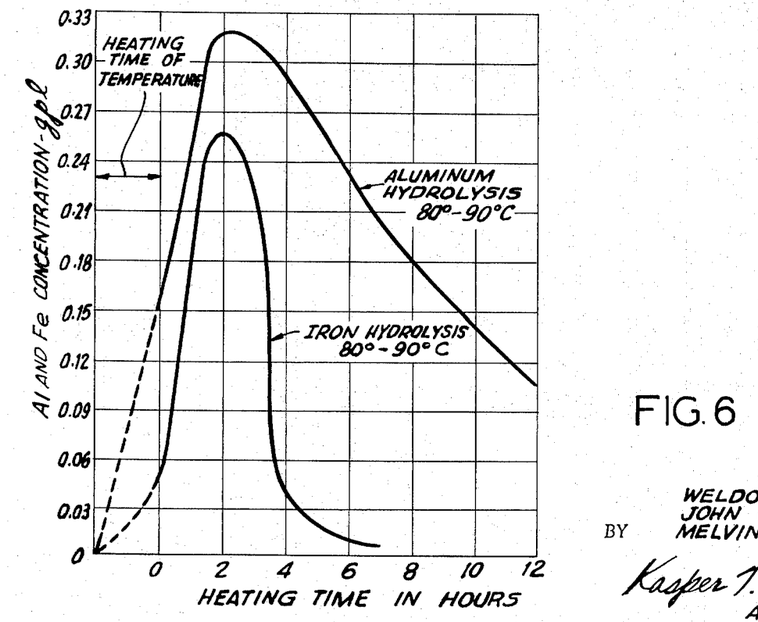
FIG. 6 depicts graphically the hydrolysis propensities of the pregnant solution with respect to the aluminum and iron contents when conditioning the ore at a temperature of about 80° to 90°C.

As will be apparent from FIG. 6 of the drawings, 4 hours appears sufficient to hydrolyze a substantial portion of the iron. As iron hydrolyzes, additional free acid is generated which advantageously dissolves more magnesium from the fresh ore. It takes longer to hydrolyze the iron at 60° to 65°C, hydrolysis generally occurring substantially after 4 hours of conditioning. Hardly any hydrolysis occurs at room temperature as the pH is very low, since the ore at that temperature does not readily dissolve. Thus, it is preferred that the iron be hydrolyzed from solution during the conditioning of the ore at temperatures in excess of 60° or 65°C, e.g. at temperatures ranging from about 75° or 80°C to the boiling point, for example, 80° to 95°C.

Figure 3:
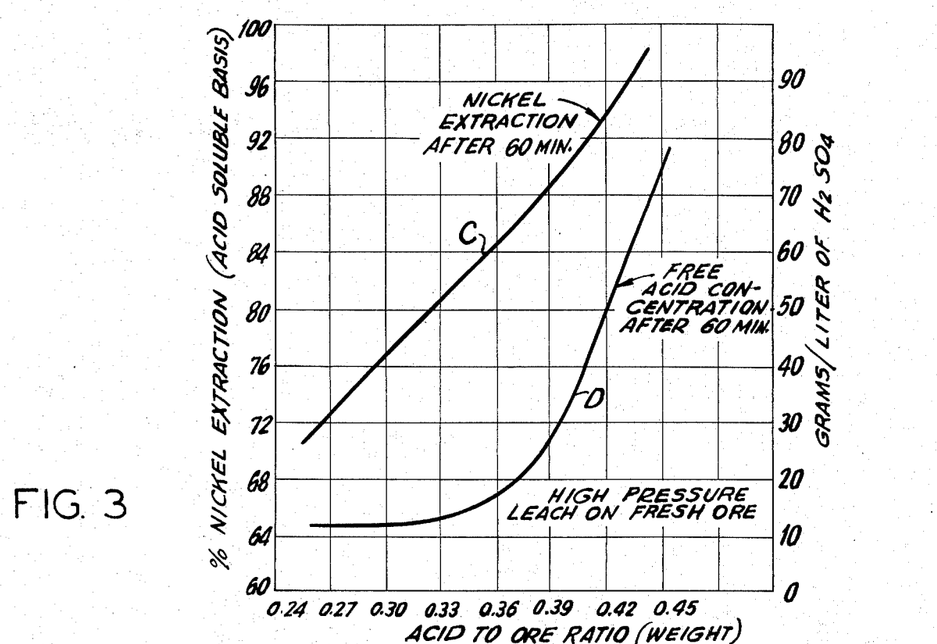

Dissolved aluminum behaves similarly as iron. Thus, at an average temperature of about 80° to 90°C, the aluminum begins to hydrolyze from solution after 2 hours (pH − 1.65). Between 6 to 12 hours (note FIG. 6), a substantial amount of aluminum hydrolyzes out. Further observations have indicated that after 17 hours, a terminal pH of 2.55 is reached and 81 percent of the leached aluminum is hydrolyzed. The markedly improved results obtained by conditioning the ore will be apparent by referring to FIGS. 3 (curves C and D) and 4 of the drawings. In FIG. 3, it will be noted that an acid-to-ore ratio of between 0.42 to 0.45 is required to solubilize at least 95 percent of the nickel in the ore; whereas, in FIG. 4 (curves E and F) an acid-to-ore ratio of between about 0.30 to 0.32 need only be employed to effect a nickel extraction of at least 95 percent.

Figure 4:
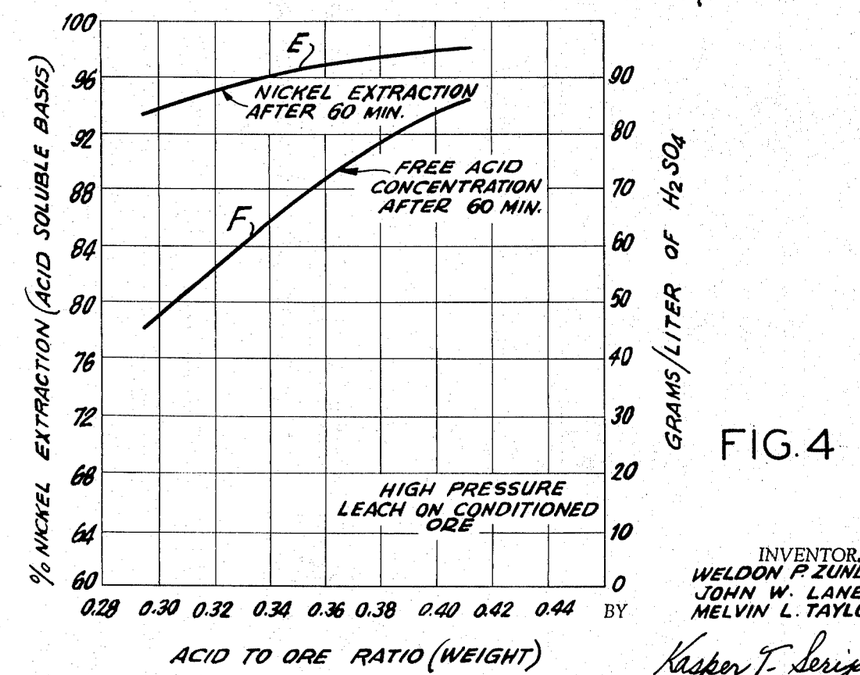
Figure 5:
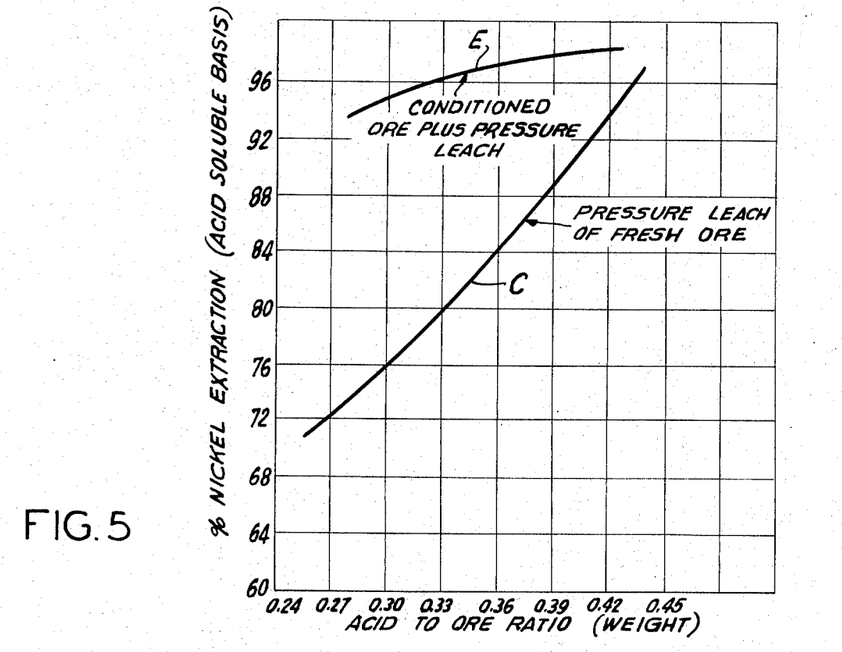
FIG. 5 illustrates graphically the improved results obtained on pressure leaching conditioned ore as compared to the inferior results obtained on pressure leaching fresh unconditioned ore.

A composite of FIGS. 3 and 4 is shown in FIG. 5 in which curve E of the conditioned ore shows a much higher yield of nickel as compared to curve C (unconditioned ore) over comparable acid-to-ore ratios.

It is clearly apparent that marked economic benefits are obtained by utilizing the method of the invention. In addition to the substantial savings in acid consumption, there are also the savings in reagent cost for neutralizing the pregnant liquor for the sulfide precipitation of nickel and cobalt.

Occasionally, it may be desirable to blend a high magnesium-containing serpentine ore with a laterite ore of lower magnesium content. The compositions of two ores which have given very good results on a 50:50 blend basis are as follows (percent by weight):

| Ore No. | Ni | Co | Fe | Al | Acid Co | Cr | Mn | Mg | Acid SO$_4$ | SiO$_2$ |
|---|---|---|---|---|---|---|---|---|---|---|
| 1 | 1.36 | 0.139 | 48.0 | 3.55 | 1.1 | 2.2 | 0.76 | 0.115 | 1.49 | 2.57 |
| 2 | 1.86 | 0.092 | 28.0 | 1.29 | — | 1.4 | 0.27 | 4.9 | — | 29.0 |

The resulting blend had the following composition: 1.61% Ni, 0.115% Co, 38% Fe, 2.42% Al, 0.55% acid Co, 1.8% Cr, 0.51% Mn, 2.51% Mg, 0.75% SO$_4$, 15.78% SiO$_2$ and the balance combined oxygen and gangue material. The 50:50 ore blend was employed in the following example:

EXAMPLE 2

A batch of the blend (at 95% minus 200 mesh) was subjected to a leaching cycle in which the pregnant liquor from the primary leach (high pressure leach) was recycled for conditioning the blend in the same manner as in Example 1. The purpose of the test was to determine the acid depletion rate during ore conditioning as affected by the temperature (60° to 65°C as compared to 80° to 90°C) and also to determine the effect of temperature on magnesium extraction during the conditioning step. The data were obtained for detention times ranging up to 6 hours. The tests were run on the ore blend mixed with the acid solution containing about 18 gpl of H$_2$SO$_4$ and at a solids content of about 20 percent by weight. The results are given in Table 1 as follows:

Table 1

| Test No. | Ore Blend | Aver. Temp. °C | Time Hours | % Extraction Acid Sol Mg. | Terminal Liquor pH | Free H$_2$SO$_4$ gpl |
|---|---|---|---|---|---|---|
| 1A | 50:50 | 60 | 0* | 2.19 | 0.94 | 13.24 |
|  | 50:50 | 63 | 2 | 16.01 | 1.29 | 6.38 |
|  | 50:50 | 63 | 4 | 21.84 | 1.40 | 4.90 |
|  | 50:50 | 63 | 6 | 26.57 | 1.54 | 3.68 |
| 1B | 50:50 | 80 | 0* | 3.59 | 0.93 | 11.77 |
|  | 50:50 | 84 | 2 | 26.27 | 1.53 | 3.43 |
|  | 50:50 | 87 | 4 | 33.72 | 1.74 | 2.21 |
|  | 50:50 | 85 | 6 | 39.17 | 1.86 | 1.96 |

*The "0" time is the time for the pulp to reach temperature.

Figure 7:
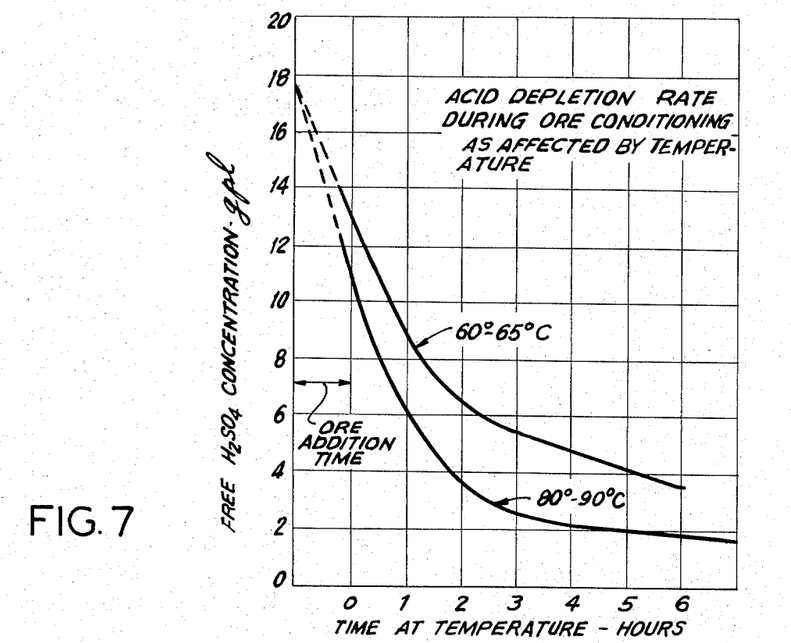
FIG. 7 is a graph showing the acid depletion rate during ore conditioning as affected by temperature, e.g. 60° to 65°C and 80° to 90°C, respectively.
Figure 8:
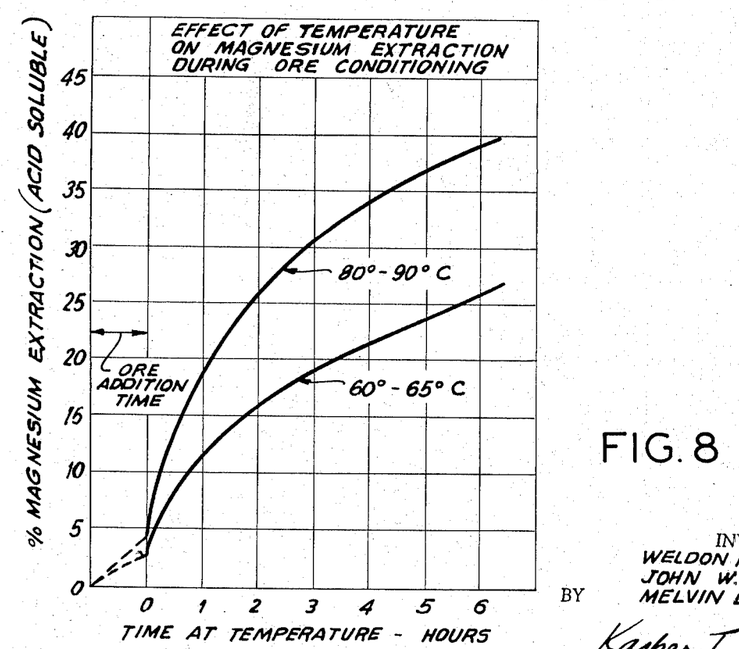
FIG. 8 shows graphically the effect of temperature on the percent magnesium extraction during ore conditioning at temperatures of 60° to 65°C and 80° to 90°C, respectively.

Referring to FIG. 7, it will be noted that the acid depletion rate is greater at the 80° to 90°C temperature than at the 60° to 65°C range. Similarly, in FIG. 8, it will be observed that substantially larger amounts of magnesium are solubilized during ore conditioning at an average temperature of about 80° to 90°C than at 60° to 65°C.

Another advantage of conditioning the ore at the higher temperature level is that additional free acid is assured for solubilizing the acid soluble magnesium by virtue of iron hydrolysis as shown in Table 2. The amount of magnesium solubilized would be the stoichiometric equivalent of the acid released by the hydrolyzed iron.

In practice, it will be noted that substantially higher amounts of magnesium will be dissolved during ore conditioning at 80° to 90°C than at 60° to 65°C due mainly to the further hydrolysis of iron.

The use of the ore conditioning step has another advantage in addition to cost saving in reagent acid. Once the ore has been conditioned, it is possible to institute process control as to the amount of acid to be added to the autoclave. Normally, close monitoring of the ore feed composition is necessary for controlling of the acid-to-ore ratio in the primary high pressure leach

Table 2

Acid Consumption by Ore Constituents

| Constituent | % of Initial Free Acid* Consumed at Temperature (6 hrs.) | |
| --- | --- | --- |
| | 60 – 65°C | 80 – 90°C |
| Ni | 3.9 | 4.4 |
| Co | 0.2 | 0.3 |
| Fe | 10.8 | 1.1 |
| Al | 14.6 | 16.3 |
| Cr | 1.6 | 1.5 |
| Mn | 0.5 | 0.8 |
| Mg | 36.7 | 54.1 |

*The values are stoichiometric sulfuric acid requirements for forming the sulfate equivalent for each constituent.

step. To assure control, the ore must either be constantly assayed and/or blended to an established ore feed composition. The ore conditioning step provides a means for simplifying this aspect of the leaching process.

Since it is possible to determine the pH of the pulp of the conditioned ore, that is, the pH of the terminal liquor after the ore conditioning step, then the proper acid requirements of the ore feed can be determined to solubilize at least 95 percent of the contained nickel.

Figure 2:
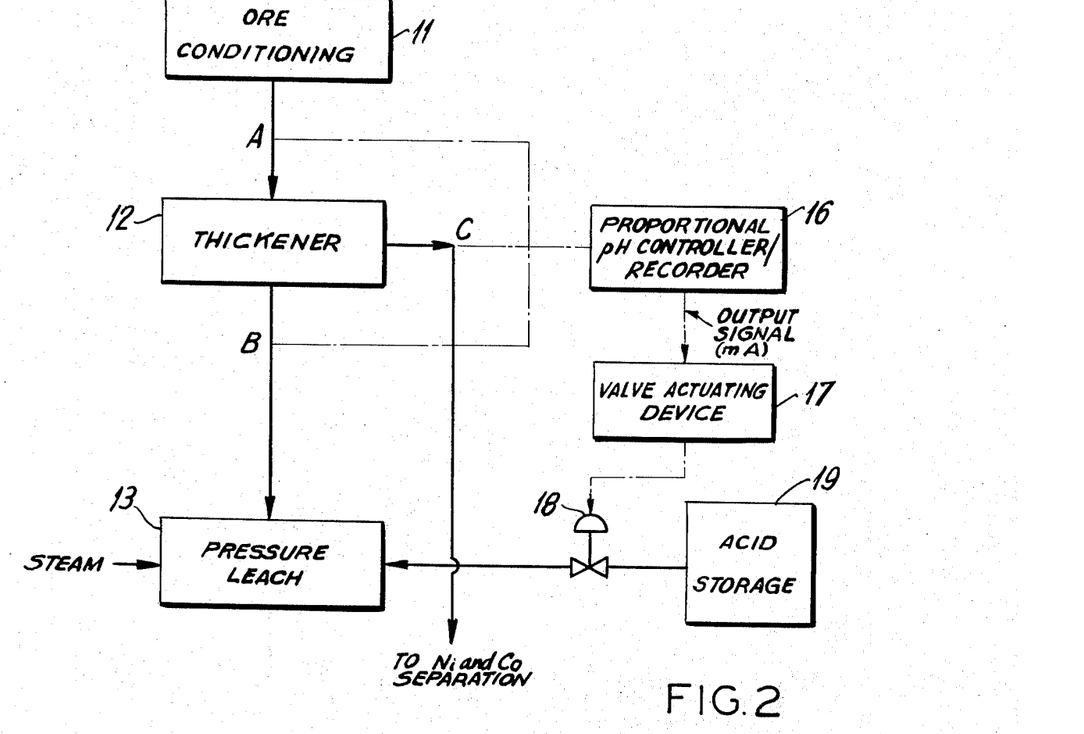
FIG. 2 depicts one portion of a flow sheet for determining and controlling the amount of acid employed in the primary leach cycle after the ore has been conditioned.

The leaching process can be programmed to accomplish the foregoing as will be apparent by referring to the partial flow sheet of FIG. 2. The method requires determining the pH following ore conditioning (11) and before the pressure leach 13 at either point A (before thickening 12), at point B (after thickening) or at point C during solution separation. The value for pH is determined by any suitable means, the pH being then used in determining the acid requirements for the conditioned ore.

For example, the voltage derived from an electrochemical cell can be applied to control the process either by utilizing the output of a pH meter to actuate control mechanisms directly or through a control-type recorder 16 for controlling the amount of acid fed from acid storage 19 to the autoclave via a valve-actuating device 17.

Referring to the partial flow sheet of FIG. 2, a box diagram is shown in which proportional pH controller-recorder 16 is coupled to measure the pH of the ore conditioning liquor at one of three possible points A, B and C. The instrument is set to a reference pH and provides an output signal (mA) which corresponds in magnitude to the difference between the final ore-conditioning pH and the pH required to leach substantially the nickel and cobalt from the conditioned ore. The output signal actuates valve-actuating device 17 which operates valve 18 to vary the amount of acid fed to the autoclave (high pressure leach) sufficient to leach the conditioned ore.

Figure 2A:
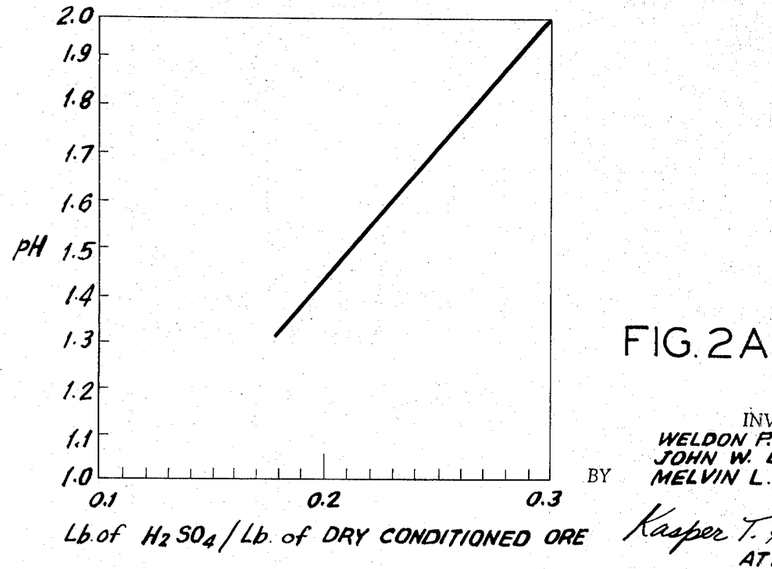
FIG. 2A is a graph correlating the pH of the solution with the acid requirements determined as pound acid per pound conditioned ore.

The amount of acid permitted to flow from acid storage to the autoclave is determined by the relationship of pH and acid/ore ratio (Note FIG. 2A).

The aforementioned technique is particularly applicable in a continuous leaching program. The pH can be correlated to the acid-to-ore ratio as shown in FIG. 2A in determining the set position on the pH controller/-recorder or similar device. Referring to FIG. 2A, the data were determined by pressure leaching the conditioned ore at 35 percent solids for 60 minutes detention at 240°C and a pressure of 525 psig. The ore conditioning was carried out at 20 percent solids over a temperature range of 80° to 90°C at a detention time of 4 hours, the ore conditioning solution containing 16 to 18 gpl of sulfuric acid.

Summarizing the foregoing (Note FIG. 1), the ore is conditioned by mixing it with recycled pregnant liquor 14A and the mixture maintained over preferably a solids content of about 10 percent to 40 percent, e.g. 15 to 20 percent, at a temperature above 60°C and ranging up to the boiling point (e.g. from about 75° or 80°C to 95°C) for a time at least sufficient to solubilize substantial amounts of magnesium such that, as the pH rises during dissolution of the acid-consuming constituents in the ore, additional free acid is generated by hydrolysis of dissolved constituents in the pregnant liquor (e.g. iron and aluminum). The conditioned ore together with the hydrolyzed constituents is thickened at 12 to about 30 percent to 40 percent solids, following which it is pressure leached. The pregnant liquor 14B is removed during thickening and sent to the nickel and cobalt separation step. The high pressure leaching is carried out at a pressure ranging from about 400 psig to 1,000 psig and a temperature ranging from about 230°C to 280°C following which the pregnant liquor formed is separated from the solids by decantation at 14 and the liquor recycled to ore conditioning step 11. After the process is on stream, a steady state develops in the system such that for an ore feed of substantially constant composition, a somewhat steady pH is developed at either points A or B of the flow sheet of FIG. 2 which can be used to determine how much acid should be added to the autoclave at 13 to effect substantially complete dissolution of the nickel and cobalt in the ore.

By using the process of the invention, substantial saving in acid can be obtained ranging from about 10 percent to as high as about 30 percent.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A continuous method of leaching magnesium-containing oxidic nickel-cobalt ores containing at least one acid-consuming constituent selected from the group consisting of oxides of iron and aluminum, wherein the ore is high pressure leached at an elevated temperature with a sulfuric acid solution to extract the nickel and cobalt therefrom such that the resulting pregnant leach liquor contains said at least one acid-consuming constituent dissolved from said ore, comprising conditioning said ore prior to leaching at substantially atmospheric pressure in an ore-conditioning step by mixing said ore directly with substantially all of the pregnant leach liquor recycled from the subsequent high pressure leaching step, said leach liquor being characterized by a free sulfuric acid content, maintaining said ore and leach liquor mixture at a temperature of over about 60°C for a time sufficient to dissolve a substantial amount of the magnesium constituent in said ore and effect hydrolysis of substantial amounts of at least one of said acid-consuming constituents in said leach liquor by virtue of a rise in the pH of said leach liquor, whereby additional free sulfuric acid is generated in situ for consumption by the magnesium constituent in said ore, thickening said conditioned ore to a solids content of at least about 10 percent by weight, separating said pregnant leach liquor from said conditioned ore and recovering the nickel and cobalt values therefrom, adding sulfuric acid to said thickened ore and subjecting it to high pressure leaching at an elevated temperature to from pregnant liquor containing nickel and cobalt from said conditioned ore, and then recycling substantially all of said pregnant liquor to said ore-conditioning step for treating fresh ore, whereby nickel and cobalt are recovered at a substantially lower acid-to-ore ratio following said ore-conditioning step.

2. The method of claim 1, wherein said ore is conditioned at a temperature ranging from about 75° to 95°C.

3. The method of claim 2, wherein said ore is conditioned at a temperature ranging from about 80°C to 90°C.

4. The method of claim 2, wherein the ore is conditioned at a solids density of about 10 percent to 40 percent.

5. The method of claim 4, wherein the ore is conditioned at a solids density of about 15 percent to 20 percent.

6. The method of claim 2, wherein the conditioned ore is subjected to high pressure leaching at a temperature of about 230°C to 280°C at a pressure of about 400 psig to 1,000 psig.

7. The method of claim 6, wherein the high pressure leach is carried out with a mixture having a solids content of about 30 percent to 40 percent.

8. A continuous method of leaching magnesium-containing oxidic nickel-cobalt ores containing at least one acid-consuming constituent selected from the group consisting of oxides of iron and aluminum, wherein the ore is high pressure leached at an elevated temperature with a sulfuric acid solution to extract the nickel and cobalt therefrom such that the resulting pregnant leach liquor contains said at least one acid-consuming constituent dissolved from said ore, comprising, conditioning said ore prior to leaching at substantially atmospheric pressure in an ore-conditioning step by mixing said one directly with substantially all of the pregnant leach liquor recycled from the subsequent high pressure leaching step to form a slurry having a solids content of about 10 percent to 40 percent, said leach liquor being characterized by an excess free sulfuric acid content of at least about 10 gpl, maintaining said ore and leach liquor mixture at a temperature of over about 60°C to the boiling point for a time sufficient to dissolve a substantial amount of the magnesium constituent in said ore and effect hydrolysis of substantial amounts of at least one of said acid-consuming constitutents dissolved in said leach liquor by virtue of a rise in pH of said liquor, whereby additional free sulfuric acid is generated *in situ* for consumption by the magnesium constituent in the ore, thickening said conditioned ore, separating said pregnant leach liquor from said conditioned ore and recovering the nickel and cobalt values therefrom, adding sulfuric acid to said conditioned ore and subjecting said ore at a solids content of about 30 percent to 40 percent to high pressure leaching at a pressure of about 400 psig to 1,000 psig at an elevated temperature of about 230°C to 280°C, whereby to form a pregnant liquor containing said nickel and cobalt, and then recycling pregnant leach liquor to said ore-conditioning step for treating fresh ore, whereby nickel and cobalt are recovered at a substantially lower acid-to-ore ratio following said ore-conditioning step.

9. The method of claim 8 wherein the ore is conditioned at a temperature of about 75°C to 95°C.

10. The method of claim 9, wherein the ore is conditioned at a temperature of about 80°C to 90°C.

11. The method of claim 9, wherein the ore is conditioned at a solids content of about 15 percent to 20 percent.

12. A continuous method of leaching magnesium-containing oxidic nickel-cobalt ores containing at least one acid-consuming constituent selected from the group consisting of oxides of iron and aluminum, wherein the ore is high pressure leached in an autoclave at an elevated temperature with a sulfuric acid solution to extract the nickel and cobalt therefrom such that the resulting pregnant leach liquor contains said at least one acid-consuming constituent dissolved from said ore, comprising, conditioning said ore prior to leaching at substantially atmospheric pressure in an ore conditioning step by mixing said ore directly with substantially all of the pregnant leach liquor recycled from the subsequent high pressure leaching step, said leach liquor being characterized by a free sulfuric acid content, maintaining said ore and leach liquor mixture at a temperature of over about 60°C for a time at least sufficient to dissolve a substantial amount of the magnesium constituent in said ore and effect hydrolysis of substantial amounts of at least one of said acid-consuming constituents dissolved in said leach liquor by virtue of a rise in the pH of said leach liquor, whereby additional free sulfuric acid is generated in situ for consumption by the magnesium constituent in said ore, thickening said conditioned ore, determining the pH of the liquor following ore conditioning, comparing said determined pH with the pH required to leach substantially the nickel from said conditioned ore thereby obtaining a pH difference, separating said pregnant leach liquor from said conditioned ore and recovering the nickel and cobalt values therefrom, feeding the conditioned ore to said autoclave, adding an amount of acid to the autoclave in accordance with said measured pH difference to leach said conditioned ore, subjecting said conditioned ore to high pressure leaching in the autoclave with said amount of sulfuric acid at a predetermined elevated temperature, and then recycling said pregnant liquor to said ore-conditioning step for treating fresh ore, whereby nickel and cobalt are recovered at a substantially lower acid-to-ore consumption ratio following said ore conditioning step.

13. The method of claim 12, wherein said ore is conditioned at a temperature ranging from about 75° to 95°C.

14. The method of claim 13, wherein said ore is conditioned at a temperature ranging from about 80°C to 90°C.

15. The method of claim 13, wherein the conditioned ore is subjected to high pressure leaching at a temperature of about 230°C to 280°C at a pressure of about 400 psig to 1,000 psig.

* * * * *